United States Patent [19]

Schuster

[11] E Patent Number: Re. 32,956

[45] Reissued Date of Patent: Jun. 20, 1989

[54] CARTON AND BLANK THEREFOR

[75] Inventor: Richard L. Schuster, West Monroe, La.

[73] Assignee: Manville Service Corporation, Ken-Caryl, Colo.

[21] Appl. No.: 117,192

[22] Filed: Nov. 4, 1987

Related U.S. Patent Documents

Reissue of:

[64] Patent No.: 4,582,199
Issued: Apr. 15, 1986
Appl. No.: 675,805
Filed: Nov. 28, 1984

U.S. Applications:

[63] Continuation-in-part of Ser. No. 557,682, Dec. 2, 1983, abandoned.

[51] Int. Cl.[4] ..... B65D 5/54; B65D 65/12; B65D 75/14

[52] U.S. Cl. ..... 206/428; 206/431; 206/434; 206/435; 229/40; 229/52 B; 229/186

[58] Field of Search ..... 206/147, 160, 427–435; 229/40, 52 B, 184, 186

[56] References Cited

U.S. PATENT DOCUMENTS

| | | | |
|---|---|---|---|
| 2,384,480 | 9/1945 | Lupton . | |
| 2,412,666 | 12/1946 | Zinn, Jr. | 229/184 |
| 2,718,998 | 9/1955 | Bemiss | 206/428 |
| 2,723,027 | 11/1955 | Guyer | 206/428 |
| 2,811,250 | 10/1957 | Arneson | 206/434 |
| 2,955,739 | 10/1960 | Collura | 206/428 |
| 3,066,795 | 12/1962 | Mansfield | 229/40 |
| 3,112,856 | 12/1963 | MacIntosh et al. | 229/52 B |
| 3,157,309 | 11/1964 | Chidsey, Jr. et al. | 229/40 |
| 3,203,584 | 8/1965 | Forrer | 229/40 |
| 3,261,534 | 7/1966 | Chidsey, Jr. | 229/186 |
| 3,313,406 | 4/1967 | Outwater | 206/431 |
| 3,371,846 | 3/1968 | Detzel | 229/40 |
| 3,552,082 | 1/1971 | Howard | 229/40 |
| 3,647,058 | 3/1972 | Farquhar | 206/431 |
| 3,652,005 | 3/1972 | Morgese | 229/40 |
| 3,705,681 | 12/1972 | Rossi et al. . | |
| 3,828,926 | 8/1974 | Rossi | 229/40 |
| 3,963,121 | 6/1976 | Kipp | 206/434 |
| 4,022,372 | 5/1977 | Graser . | |
| 4,032,053 | 6/1977 | Wilson | 206/428 |
| 4,214,695 | 7/1980 | Cooper . | |
| 4,375,258 | 3/1983 | Crayne et al. . | |
| 4,451,001 | 5/1984 | Webinger | 229/40 |

FOREIGN PATENT DOCUMENTS

| | | | |
|---|---|---|---|
| 492310 | 11/1974 | Australia . | |
| 0741661 | 8/1966 | Canada | 229/40 |
| 2052618 | 5/1971 | Fed. Rep. of Germany | 206/429 |
| 1423906 | 11/1965 | France . | |
| 2457221 | 12/1980 | France . | |
| 2508415 | 12/1982 | France | 206/427 |

*Primary Examiner*—Jimmy G. Foster
*Attorney, Agent, or Firm*—Brooks & Kushman

[57] ABSTRACT

A carton for packaging a plurality of articles having rectangular or square bases and sides such as aseptic packages and the carton blank therefor. In one embodiment the carton includes a base, side panels, inner and outer top panels with handle straps and partial end panels held in an upright position by tuck flaps. In another embodiment the carton includes a base, side panels, inner and outer top panels, partial end panels and tear strips on the side panels to convert the carton to a display.

13 Claims, 4 Drawing Sheets

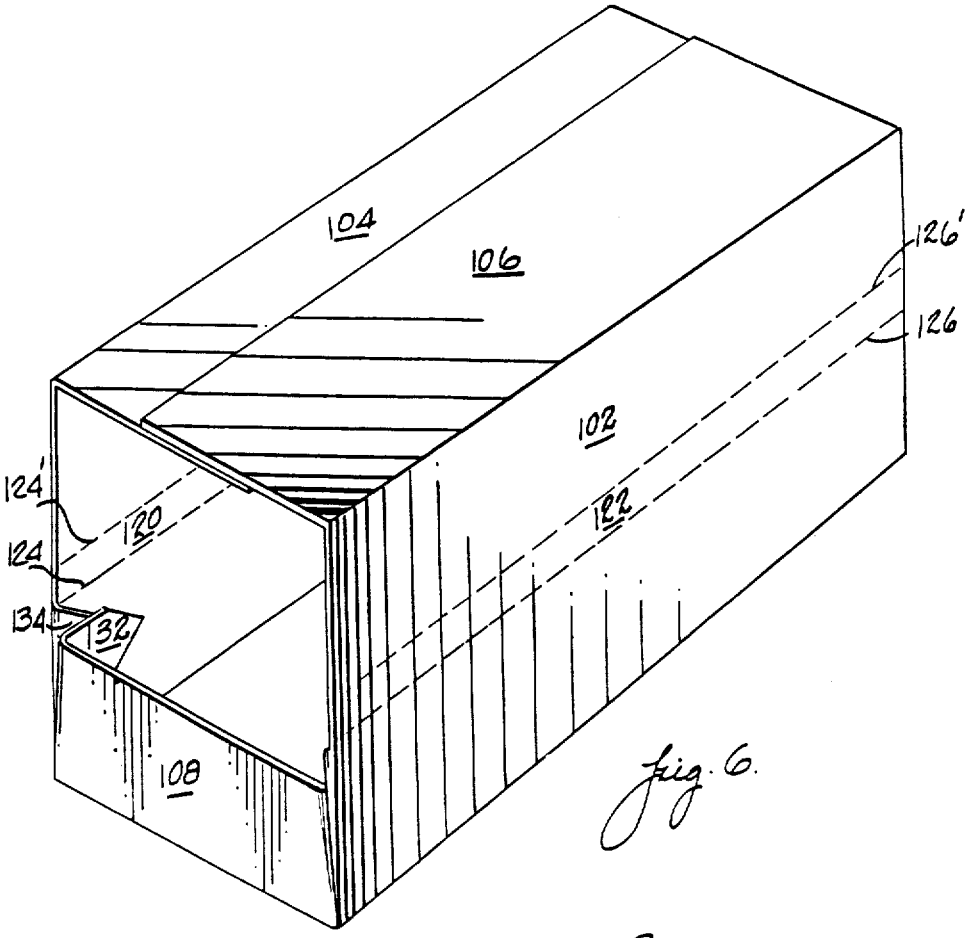
fig. 6.
fig. 5.
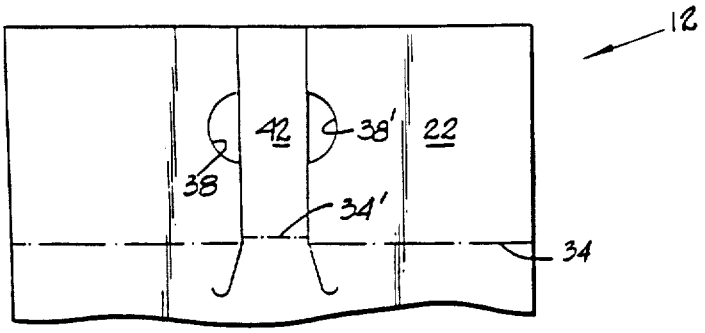

CARTON AND BLANK THEREFOR

Matter enclosed in heavy brackets [ ] appears in the original patent but forms no part of this reissue specification; matter printed in italics indicates the additions made by reissue.

REFERENCE TO RELATED APPLICATION

This application is a continuation in part of U.S. Ser. No. 06/557,682, filed Dec. 2, 1983, now abandoned.

BACKGROUND OF THE INVENTION

This invention relates to secondary packages for packaging a plurality of articles and more particularly to a carton and blank therefor wherein the carton is designed to package a plurality of articles or containers having rectangular or square bases and side walls.

Beverages and other products are currently being marketed in aseptic containers which are formed with rectangular or square (hereinafter "rectangular") bases and sidewalls. These containers not only provide a long shelf life for the beverages and other products but the rectangular shaped packages eliminate wasted space when a plurality of these containers are packaged in secondary packaging. There are no voids such as those which occur when a plurality of bottles or other cylindrical type containers are being packaged.

Aseptic containers of the type described above are currently being marketed in sets of three containers which are packaged or wrapped in a plastic film or taped together. However, it appears as though this type of secondary packaging is not suitable for packaging larger numbers of containers such as six, nine, twelve or more containers.

The present invention is directed to a secondary package or carton which can be used to package three, six, nine, twelve or more aseptic type containers. In one embodiment of the present invention, the carton is provided with a handle that raises to permit the consumer to easily pick up the package. The handle has a double thickness of paperboard for added strength which is required for some packages such as nine packs of 8½ ounce containers where the contents can approach five pounds. Partial end panels on the carton function to retain the containers within the carton and to cover the UPC code printed on the individual containers. The end panels are configured such that, when folded as part of the carton, they are bowed slightly inwardly such that they will not interfere with other cartons or loading of the containers into the package. In a second embodiment, the carton is provided with one or two tear strips. This carton is to be used for shipping and as a display where individual containers are to be sold. The modification of the carton from a shipping carton to a display is easily achieved by tearing off one or both of the tear strips after which the top can be folded back or removed.

BRIEF DESCRIPTION OF THE DRAWINGS

FIG. 5 is a partial plan view of a modification of the blank illustrated in FIG. 4 wherein the core lines are offset on the handle straps;

FIG. 6 is a perspective view of a second embodiment of the carton of the present invention with no containers therein.

DETAILED DESCRIPTION OF THE INVENTION

Figure 1:
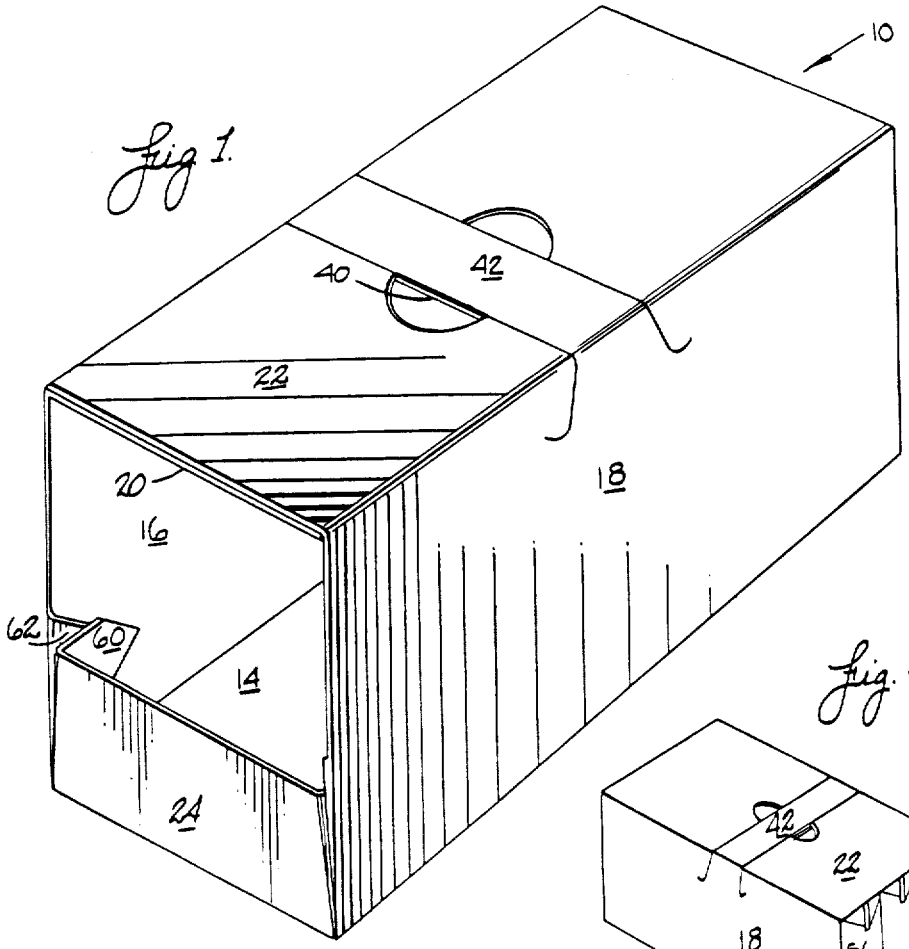
FIG. 1 is a perspective view of a first embodiment of the carton of the present invention with no containers therein.
Figure 4:
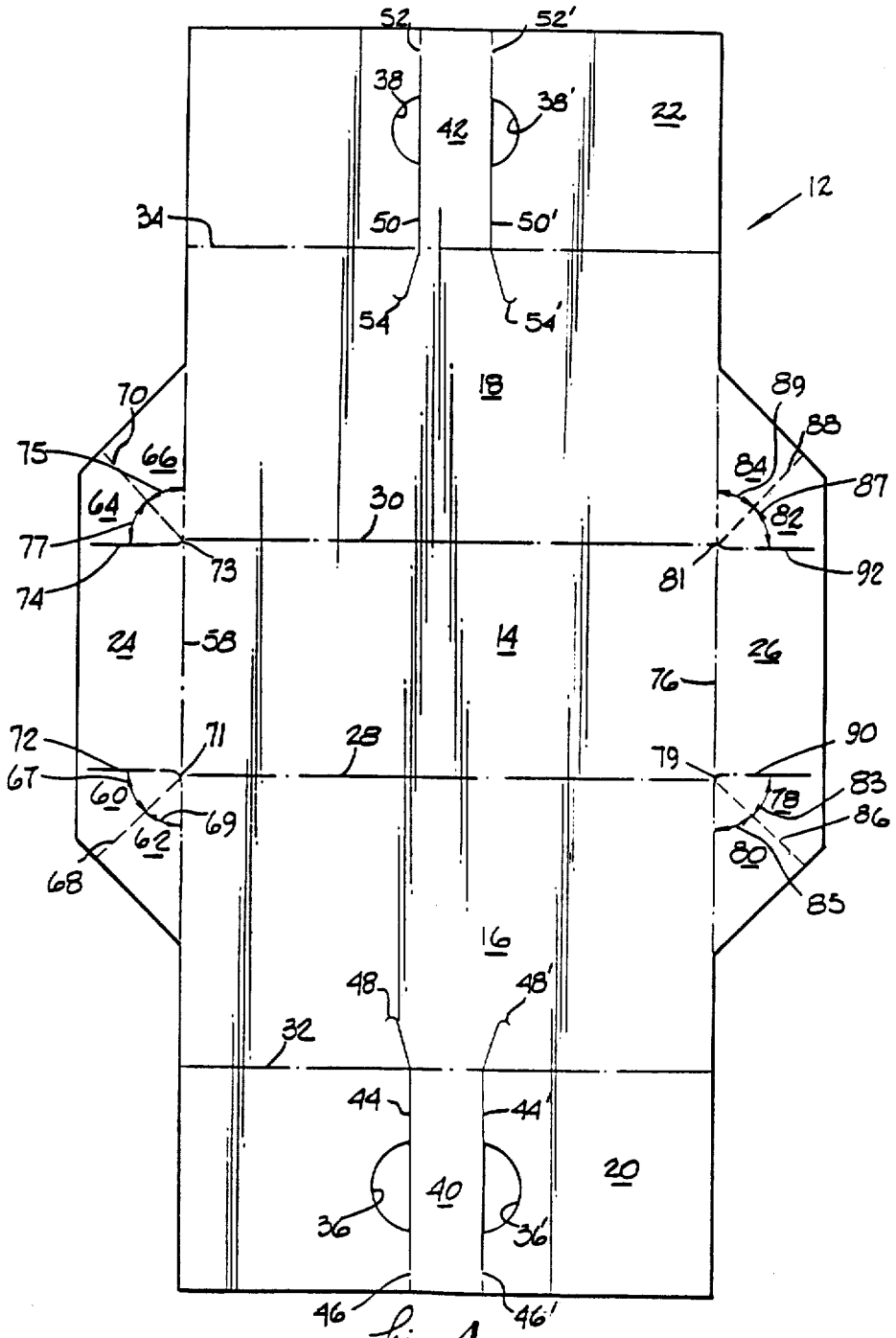
FIG. 4 is a plan view of the production blank for the carton of FIG. 1.

Referring now to FIGS. 1 and 4 of the drawings, a first embodiment of the paperboard carton 10 and the production blank 12 which is formed into the carton 10 are shown. This embodiment includes a bottom panel 14, side panels 16 and 18, inner and outer top panels 20 and 22, and partial end panels 24 and 26.

As best shown in FIGS. 1 and 4, the bottom panel 14 is hingedly joined at its side edges to the side panels 16 and 18 along bottom score lines 28 and 30. The side panels 16 and 18 are hingedly joined at their upper edges to the inner and outer top panels 20 and 22 respectively along top score lines 32 and 34.

Figure 2:
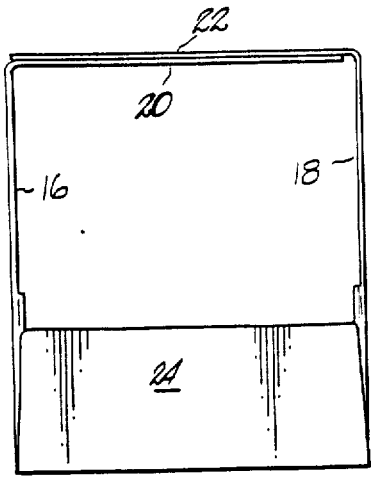
FIG. 2 is an end view of the carton of FIG. 1.

The top panels both extend substantially the entire width of the carton as shown in FIGS. 1 and 2 and are adhesively secured together by two beads of adhesive applied along the upper side of the free edge of the inner panel 20 and along the under side of the free edge of the outer panel 22.

The inner top panel and the outer top panel are each provided with a pair of semicircular cutouts, 36, 36' and 38, 38' respectively. The cutouts 36 and 36' are spaced from each other and are centrally located on the inner top panel 20. The cutouts 38 and 38' are spaced from each other; are centrally located on the outer top panel 22; and are smaller in size than cutouts 36, 36'. As best shown in FIG. 1, the cutouts 36 and 36' of the inner top panel 20 register with the cutouts 38 and 38' respectively of the outer top panel 22 in the finished carton 10. However, if there is any misalignment of the inner and outer panels, the larger cutouts 36, 36' in the inner top panel 20 prevent the inner top panel from showing. This preserves the neat appearance of the carton.

The inner top panel 20 and the outer top panel 22 are also provided with handle straps 40 and 42 located intermediate the cutouts 36, 36' and 38, 38' respectively. The straps 40 and 42 each extend the entire width of the top panels 20 and 22 and down the upper portions of the side panels 16 and 18 where the straps end. The strap 40 is defined by a pair of cut lines 44 and 44' which except for short retaining sections 46 and 46' extend continuously from the free side edge of the inner top panel 20 to the anti-tear radii 48 and 48' on the side panel 16. The width of the inner strap 40 is equal to or less than the width of the outer strap 42. With this construction the outer strap 42 covers the inner strap 40. The strap 42 is defined by a pair of cut lines 50 and 50' which except for short retaining sections 52 and 52' extend continuously from the free side edge of the outer top panel 22 to the anti-tear radii 54 and 54' on the side panel 18. The short retaining sections 46, 46' and 52, 52' retain the straps in place while the production blank 12 is being formed into carton 10. However, when the consumer picks up the carton 10 by inserting fingers into the cutouts and beneath portions of the straps 40 and 42 the extension of the straps down the side panels 16 and 18 allow the handle straps to be raised and the weight of the contents of the carton 10 on the short retaining sections 46, 46' and 52, 52' cause these sections to part from the top panels 20 and 22 as the handle straps are raised. The score lines 32 and 34 on the blank 12 can be offset onto the inner and outer top panels 20 and 22 a short distance where the score lines cross handle straps 40 and 42. FIG. 5 illustrates handle strap 42 with the score line 34 offset where it crosses the handle strap. The offset portion is designated 34'. With this construction the handle straps on the carton 10 would be slightly raised prior to the time the consumer picks up the carton thereby making it easier for the consumer to insert his or her fingers under the handle straps 40, 42.

The partial end panels 24 and 26 are substantially one-third the height of the side panels 16 and 18. At this height the partial end panels function to cover the UPC code on the containers 56 in the carton 10 and to retain the containers within the carton.

The partial end panel 24 is hingedly joined to the bottom panel 14 along side score line 58 and is joined to side panels 16 and 18 by tuck flaps 60, 62 and 64, 66. The tuck flaps 60, 62 and 64, 66 are each generally triangular in shape. Tuck flaps 60 and 64 are hingedly joined to partial end panel 24 along end score lines 72 and 74. End score lines 72 and 74 are offset from bottom score lines 28 and 30 and intersect score lines 28 and 30 at rounded portions 71 and 73 of score lines 72 and 74. Tuck flaps 62 and 66 are hingedly joined to side panels 16 and 18 along extensions of side score line 58. Tuck flaps 60 and 62 are hingedly joined together along tuck score line 68. Tuck score line 68 which may also be a perforated line extends to the intersection of score lines 28, 72, and 58. Perforated line 68 is located so as to subtend an angle 67 [greater than 45° ]*less than 45°* from end score line 72 and angle 69 [less than 45° ]*greater than 45°* from side score line 58. Tuck flaps 64 and 66 are hingedly joined together along tuck score line 70 which may be a perforated line which extends to the intersection of score lines 30, 74 and 58. Perforated line 70 is located so as to subtend on angle 75 [less than 45° ]*greater than 45°* from side score line 58 and an angle 77 [greater than 45° ]*less than 45°* from end score line 74. Angles 67 plus 69 total 90° as do angles 75 plus 77. In the preferred embodiment angles 67 and 77 are [47° ] *43°* while angles 69 and 75 are [43° ]*47°*.

Figure 3:
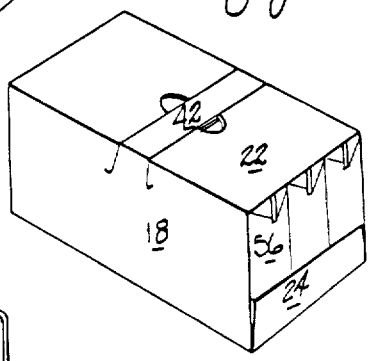
FIG. 3 is a perspective view of the carton of FIG. 1 with containers packaged therein.

Perforated lines 68 and 70 enable the tuck flaps 60, 62 and 64, 66 to be easily and rapidly tucked into place during the high speed packaging of containers 56. With such packaging operations it is essential that the carton blanks be readily foldable into the carton 10 so that the machinery will not become jammed and the cartons will be formed properly. When the tuck flaps 60, 62 and 64, 66 are folded up into position between the side panels 16 and 18 and the containers 56, as shown in FIG. 3, the tuck flaps hold the end panel 24 in an upright position and retain it there without the need for adhesive. Because offset score lines 72 and 74 as well as the unequal angles 67, 69 and 75, 77, end panel 24 is held approximately perpendicular to bottom 14 with a slight inward bow in the center of end panel 24 toward the inside of carton 10. This slight inward bow eliminates interference between adjacent cartons during packing caused by the outward bow which would occur if standard score lines and 45° angles are utilized. Any inward bow is eliminated upon loading of containers 56 which contact the end panels and hold them substantially vertical.

Partial end panel 26 is hingedly joined to the bottom panel 14 along side score line 76 and is joined to side panels 16 and 18 by tuck flaps 78, 80 and 82, 84. As best seen in FIG. 4, the tuck flaps 78, 80 and 82, 84 are identical in shape to tuck flaps 60, 62 and 64, 66. The tuck flaps 78 and 82 are hingedly joined to partial end panel 26 along score lines 90 and 92. Tuck flaps 80 and 84 are hingedly joined to side panels 16 and 18 along extensions of side score line 76. End score lines 90 and 92 are offset from bottom score lines 28 and 30 intersecting score lines 28 and 30 at rounded portions 79 and 81 of score lines 90 and 92. Tuck flaps 78 and 80 are hingedly joined together along tuck score line 86 which may be a tuck score line. Perforated line 86 which may be a perforated line extends to the intersection of score lines 28, 90 and 76. Perforated line 86 is located so as to subtend an angle 83 [greater than 45° ]*less than 45°* from score line 90 and angle 85 [less than 45° ]*greater than 45°* from score line 76. Tuck flaps 82 and 84 are hingedly joined together along tuck score line 88 which may be a perforated line which extends to the intersection of score lines 30, 92 and 76. Perforated line 88 is located so as to subtend an angle 87 [greater than 45° ]*less than 45°* from score line 92 and an angle 89 [less than 45° ]*greater than 45°* from score line 76. As indicated above the tuck flaps 78, 80 and 82, 84 are identical in configuration to tuck flaps 60, 62 and 64, 66 and function in the same manner as tuck flaps 60, 62 and 64, 66.

While score lines 28, 30, 58 76 and the extensions of those score lines are provided to facilitate the folding of the blank 12 into carton 10, spaced relief cuts or skip cut score lines can be used when required to provide even better folding of the panels.

Figure 7:
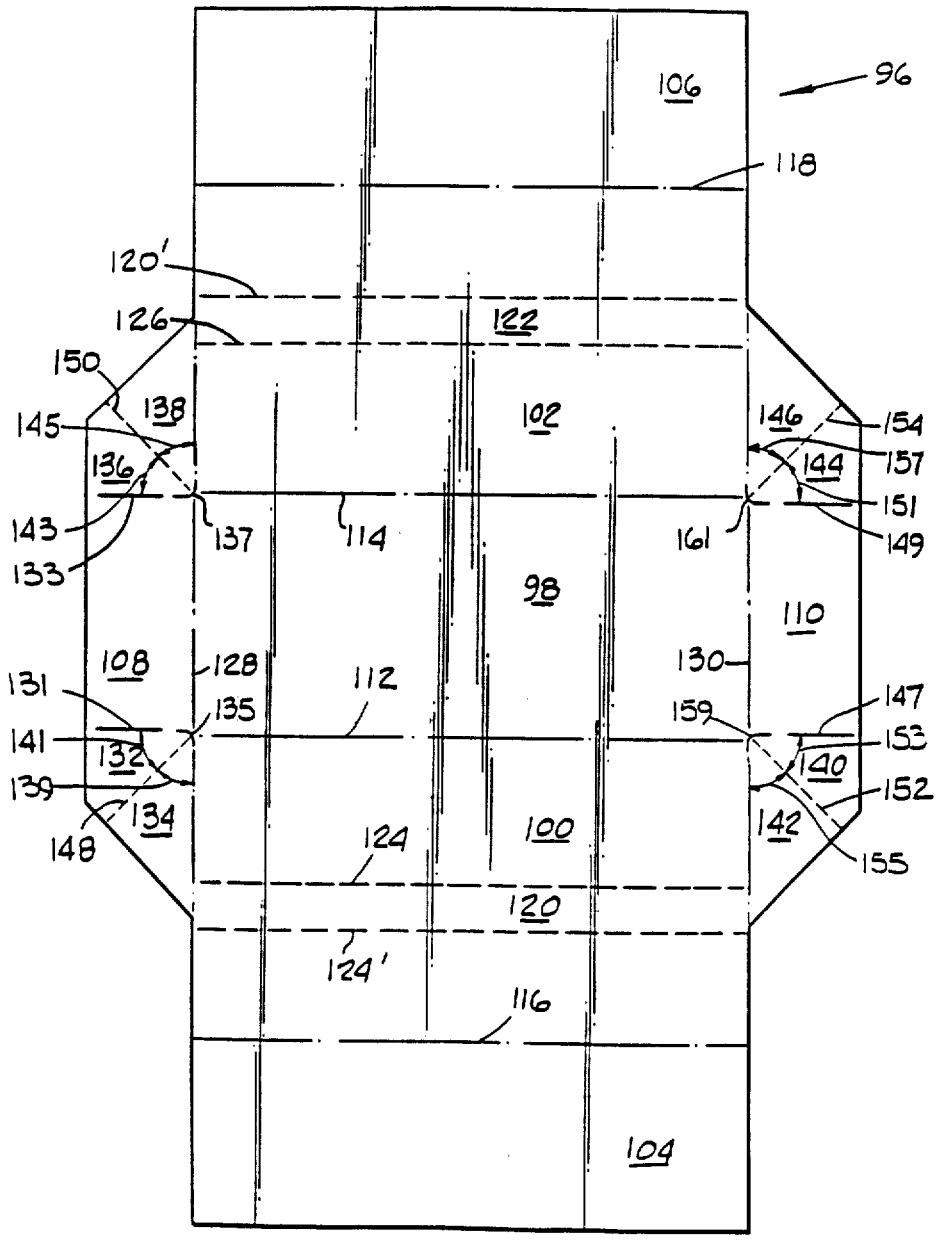
FIG. 7 is a plan view of the production blank for the carton of FIG. 5.

FIGS. 6 and 7 illustrate the second embodiment of the present invention which is designed for use as both a shipping carton and a display. FIG. 6 illustrates the paperboard carton 94 and FIG. 7 illustrates the production blank 96 for the carton 94. This embodiment includes a bottom panel 98, side panels 100 and 102, inner and outer top panels 104 and 106 and partial end panels 108 and 110.

The bottom panel 98 is hingedly joined at its side edges to side panels 100 and 102 along score lines 112 and 114. The side panels 100 and 102 are hingedly joined at their upper edges to inner and outer top panels 104 and 106 respectively along score lines 116 and 118.

The top panels each extend approximately two-thirds of the width of the carton 94 and are adhesively secured together by two beads of adhesive applied along the upper side of the free edge of the inner top panel 104 and along the underside of the free edge of the outer top panel 106.

The side panels 100 and 102 are each provided with tear strips 120 and 122. The tear strips 120 and 122 each extend the entire length of side panels 100 and 102 and are defined by perforated lines 124, 124' and 126, 126' respectively. The lower perforated lines 124 and 126 are at the same height as the tops of the partial side panels 108 and 110. With this construction one of the tear strips can be torn off and the top of the carton 94 folded back along the lower perforated score line of the other tear strip to form a display or both tear strips can be torn off to completely remove the top of the carton 94 to form a display from which the containers 56 can be sold individually.

The partial end panels 108 and 110 are subtantially one-third the height of the side panels 100 and 102. At this height the partial end panels function to cover the UPC code on the containers 56 in the carton 94 and to retain the containers within the carton.

The partial end panels 108 and 110 are hingedly joined to the bottom panel 98 along score lines 128 and 130. Partial end panel 108 is hingedly joined to side panels 100 and 102 by tuck flaps 132, 134 and 136, 138. The partial end panel 110 is hingedly joined to side panels 100 and 102 by tuck flaps 140, 142 and 144, 146. Each pair of tuck flaps are hingedly joined together along perforated lines 148, 150, 152 and 154. Tuck flaps 132, 136 are hingedly joined to end panel 108 along end score lines 131, 133. Score lines 131 and 133 are offset from bottom score lines 112 and 114 intersecting score lines 112, 114, 128 at rounded portions 135, 137 of score lines 131, 133. Tuck flaps 134, 138 are hingedly joined to side panels 100, 102 along extensions of side score line 128. Tuck flaps 132, 134 are hingedly joined at tuck score line 148 which may be a perforated line 148. Perforated line 148 is located so as to subtend an angle 141 [greater than 45° ]*less than 45°* from end score line 131 and angle 139 [less than 45° ]*greater than 45°* from side score line 128. Tuck flaps 136, 138 are hingedly joined at tuck score line 150 which may include a perforated line 150. Perforated line 150 is located so as to subtend an angle 143 [greater than 45° ]*less than 45°* from end score line 133 and an angle 145 [less than 45° ]*greater than 45°* from side score line 128. Angles 138 plus 141 total 90° as do angles 143 plus 145. Tuck panels 140, 142, 144, and 146 are similarly configured along score lines 130, 112, 114, 147, 149, 152 and 154 such that angles 151 and 153 are [greater than 45° ]*less than 45°* and angles 155 and 157 are [less than 45° ]*greater than 45°*. Score lines 147 and 149 terminate in rounded portions 157, 161 as with the previously described tuck panel arrangements. The tuck flaps of the second embodiment are shaped the same as and function in the same manner as the tuck flaps of the first embodiment with the following exception. The tuck flaps of the second embodiment are adhesively bonded together and to the side panels 100 and 102. With this construction when the top of the carton 94 is either partially or totally removed, the lower portion of the carton will remain intact for use as a display. To eliminate one gluing operation the upper portions of tuck flaps 134, 138, 142 and 146 can be cut down so that the upper portions of tuck flaps 132, 136, 140 and 144 extend above tuck flaps 134, 138, 142 and 146. With this construction, the tuck flaps 132, 136, 140 and 144 can be adhesively secured directly to the side panels 100 and 102. As with the first embodiment, the offset score lines 131, 133, 147 and 149 in combination with the location of the perforated lines 148, 150, 152, 154 maintain a slight inward bow when the carton is assembled to eliminate interference between carton and facilitate container loading.

As with the first embodiment the score lines 112, 114, 128, 130, 131, 133, 147 and 149 can be replaced with skip-cut score lines to facilitate easier folding of the panels to form the carton 94.

I claim:

1. A paperboard carton for packaging a multiple of articles comprising:

a bottom panel;

first and second side panels hingedly joined at their lower edges to opposite side edges of the bottom panel along bottom score lines; outer and inner top panels hingedly joined to upper edges of the first and second side panels along top score lines with the outer top panel overlying and being adhesively secured to the inner top panel;

first and second partial end panels hingedly joined to opposite ends of the bottom panel along side score lines;

tuck flap means for holding said first and second end panels in an upright position such that said end panels are bowed inwardly, said tuck flap means joined to said end panels by end score lines offset from said bottom score lines such that the distance between the end score lines is less than the distance between the bottom score lines, said tuck flap means including a tuck score line intersecting said side score lines and said end score lines such that the angle between said tuck score line and said end score line is [more than 45° ]*less than 45°* while the angle between said tuck score line and said side score line is [less than 45° ]*greater than 45°*; and handle means on said inner and outer top panels comprising a pair of spaced substantially semicircular cutouts in each of the top panels, the pair of cutouts in the inner top panel registering with the pair of cutouts in the outer top panel and a strap on each of the top panels located intermediate the cutouts, said straps extending substantially the entire width of the respective top panel, being defined by a pair of spaced apart cut lines and registering with the other strap whereby a double thickness handle is formed with access finger cutouts.

2. The paperboard carton of claim 1 wherein said tuck score line is a perforated line.

3. The paperboard carton of claim 1 wherein:

the heights of the partial end panels are substantially one-third the height of the side panels.

4. The paperboard carton of claim 1 wherein:

each handle strap has an end portion terminating on one of the side panels, each end portion being defined by a pair of cut lines which diverge as the cut lines extend down from the upper edge of the side panel.

5. The paperboard carton of claim 1 wherein:

each handle strap is hingedly joined to the adjacent side panel along a score line offset upwardly from the top score line joining the respective top panel and the side panel.

6. A paperboard blank for a carton for packaging a multiple of articles comprising:

a bottom panel;

first and second side panels hingedly joined at their lower edges to opposite side edges of the bottom panel along bottom score lines;

outer and inner top panels hingedly joined to upper edges of the first and second side panels along top score lines;

first and second partial end panels hingedly joined to opposite ends of the bottom panel along side score lines;

tuck flaps joining each partial end panel to the first and second side panels, said tuck flaps including a pair of generally triangular shaped flaps hingedly joined together along a tuck score line and joined to the side panel along side score lines and the end panel along end score lines, *said end score lines being parallel to one another and* said tuck score lines intersecting said side score lines and said end score lines such that the angle formed by the intersection of said tuck score line and said end score line is greater than 45° and the angle formed by the intersection of said tuck score line and said side score line is less than 45°; and handle means on said inner and outer top panels comprising a pair of spaced substantially semicircular cutouts in each of the top panels adapted to register when the carton is formed and a strap on each of the top panels located intermediate the cutouts, each strap extending substantially the entire width of the respective top panels, being defined by a pair of cut lines, and adapted to register when the carton is formed.

7. The paperboard carton blank of claim 6 wherein:

each handle strap has an end portion terminating on one of the side panels, each end portion being defined by a pair of cut lines which diverge as the cut lines extend down from the upper edge of the side panel.

8. A paperboard carton for packaging a multiple of articles comprising:

a bottom panel;

first and second side panels hingedly joined at their lower edges to opposite side edges of the bottom panel along bottom score lines; outer and inner top panels hingedly joined to upper edges of the first and second side panels along top score lines with the outer top panel overlying and being adhesively secured to the inner top panel;

first and second partial end panels hingedly joined to opposite ends of the bottom panel along side score lines, each partial end panel being held in an upright position by a pair of tuck flap means which are adhesively secured to the side panels; and tuck flap means for holding said first and second end panels in an upright position such that said end panels are bowed inwardly, said tuck flap means joined to said end panels by end score lines offset from said bottom score lines such that the distance between the end score lines is less than the distance between the bottom score lines, said tuck flap means including a tuck score line intersecting said side score lines and said end score lines such that the angle between said tuck score line and said end score line is [more than 45° ]*less than 45°* while the angle between said tuck score line and said side score line is [less than 45° ]*more than 45°* ; and tear strip means on at least one of the side panels, said tear strip means extending the entire length of the side panel, being defined by a pair of perforated lines and being located at substantially the same height as the tops of the partial end panels.

9. The paperboard carton of claim 8 wherein:

the heights of the partial end panels are substantially one-third the height of the side panels.

10. A paperboard blank for a carton for packaging a multiple of articles comprising:

a bottom panel;

first and second side panels hingedly joined at their lower edges to opposite side edges of the bottom panel along bottom score lines;

outer and inner top panels hingedly joined to upper edges of the first and second side panels along top score lines;

first and second partial end panels hingedly joined to opposite ends of the bottom panel along side score lines, each partial end panel being hingedly joined to the first and second side panels by tuck flaps; and tuck flap means for holding said first and second end panels in an upright position such that said end panels are bowed inwardly, said tuck flap means joined to said end panels by end score lines offset from said bottom score lines such that the distance between the end score lines is less than the distance between the bottom score lines, said tuck flap means including a tuck score line intersecting said side score lines and said end score lines such that the angle between said tuck score line and said end score line is [more than 45° ]*less than 45°* while the angle between said tuck score line and said side score line is [less than 45° ]*greater than 45°*; and tear strip means on at least one of the side panels, said tear strip means extending the entire length of the side panel, being defined by a pair of perforated lines and being located a distance from the lower edge of the side panel substantially equal to the heights of the partial end panels.

11. The paperboard carton of claim 1, wherein the angle between the tuck score line and the end score line is approximately [47° ]*43°* and the angle between the tuck score line and the side score line is approximately [43°. ]*47°*.

12. The paperboard blank of claim 6, wherein the angle between the tuck score line and the end score line is approximately [47° ]*43°* and the angle between the tuck score line and the side score line is approximately [43° ]*47°*.

*13. A paperboard carton for packaging a multiple of articles comprising:*

*a bottom panel;*

*first and second side panels hingedly joined at their lower edges to opposite side edges of the bottom panel along bottom score lines;*

*outer and inner top panels hingedly joined to upper edges of the first and second side panels along top score lines with the outer top panel overlaying and being adhesively secured to the inner top panel;*

*first and second partial end panels hingedly joined to opposite ends of the bottom panel along side score lines; and*

*tuck flap means for holding said first and second end panels in an upright position such that said end panels are bowed inwardly, said tuck flap means joined to said end panels by end score lines offset from said bottom score lines such that the distance between the end score lines is less than the distance between the bottom score lines, said tuck flap means including a tuck score line intersecting said side score lines and said end score lines such that the angle between said tuck score line and said end score line is less than 45° while the angle between said tuck score line and said side score line is more than 45°.*

* * * * *